US011894979B2

(12) United States Patent
Mazzitelli et al.

(10) Patent No.: US 11,894,979 B2
(45) Date of Patent: Feb. 6, 2024

(54) MAPPING PROXY CONNECTIVITY

(71) Applicant: Red Hat, Inc., Raleigh, NC (US)

(72) Inventors: John Mazzitelli, Trenton, NJ (US); Jay Shaughnessy, Trenton, NJ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/538,844

(22) Filed: Nov. 30, 2021

(65) Prior Publication Data

US 2023/0171162 A1 Jun. 1, 2023

(51) Int. Cl.
*H04L 41/12* (2022.01)
*H04L 67/56* (2022.01)

(52) U.S. Cl.
CPC ............ *H04L 41/12* (2013.01); *H04L 67/56* (2022.05)

(58) Field of Classification Search
CPC ................................ H04L 41/12; H04L 67/56
See application file for complete search history.

(56) References Cited

U.S. PATENT DOCUMENTS

| | | | | |
|---|---|---|---|---|
| 10,680,918 B1* | 6/2020 | Mazzitelli | ............... | H04L 67/51 |
| 10,827,020 B1* | 11/2020 | Cao | ........................ | H04L 67/561 |
| 2017/0279660 A1* | 9/2017 | Muntés-Mulero | .... | H04L 41/065 |
| 2020/0127980 A1 | 4/2020 | Smith et al. | | |
| 2021/0019194 A1 | 1/2021 | Bahl et al. | | |
| 2021/0075700 A1 | 3/2021 | Palladino et al. | | |
| 2022/0141304 A1* | 5/2022 | Gefen | ..................... | G06F 9/445 709/219 |

OTHER PUBLICATIONS

"Service meshes in a microservices architecture," <https://cloud.google.com/architecture/service-meshes-in-microservics-architecture>, Last updated Feb. 16, 2021, 18 pages.
Stafford, Gary A., "Kubernetes-based Microservice Observaility with Istio Service Mesh: Part 1," ITNEXT, <https://itnext.io/kubernetes-based-microservice-observability-with-istio-service-mesh-part-1-bed3dd0fac0b>, Mar. 11, 2019, 26 pages.
Chandramoulia, Ramaswamy, et al., "Building Secure Microservices-based Applicatios Using Service-Mesh Architecture," National Institute of Standards and Technology, Jan. 2020, 26 pages.

* cited by examiner

*Primary Examiner* — Suraj M Joshi
(74) *Attorney, Agent, or Firm* — Womble Bond Dickinson (US) LLP (57) ABSTRACT

Processing logic may obtain a configuration file of each of one or more proxies. Processing logic may parse the configuration file of each of the one or more proxies to determine one or more connections for each of the one or more proxies as defined by the configuration file. Each connection may support incoming or outgoing communication for each of the one or more proxies. Processing logic may generate a map that includes the one or more connections for each of the one or more proxies.

20 Claims, 6 Drawing Sheets

MAPPING PROXY CONNECTIVITY

TECHNICAL FIELD

Aspects of the present disclosure relate to proxies, and more particularly, to mapping connections between proxies.

BACKGROUND

A proxy, which may also be referred to as a proxy server, may be a server application that serves as an intermediary between a sender and a receiver of data. For example, a client may direct a request for data to a proxy, which evaluates the request. If the proxy is satisfied with the request, the proxy may perform the network transaction by forwarding the request to the intended destination. The proxy may also receive a response and then forward the contents of the response to the client.

Proxies may be implemented with different architectures and used for various internet-based applications. For example, proxies may be used by single services, applications, or a microservices application.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A proxy, or proxy server may be a server application that serves as an intermediary between a sender and a receiver of data. Some proxies such as an Envoy proxy, may support various communication protocols such as, for example, TCP protocol, SSL protocol, Web sockets, or other communication protocol. Proxies may communicate with each other, thereby forming what may be understood as a service mesh. Additionally, or alternatively, proxies may communicate with non-proxy endpoints, such as an endpoint server.

An application with a microservices architecture lets developers make changes to an application without fully redeploying the entire application. Unlike application development in monolithic architectures, individual microservices of a microservices application may be built by small teams with the flexibility to choose their own tools and coding languages. Microservices of a common application may be built independently of each other, communicate with each other, can individually fail, and individually be modified and redeployed. Thus, an upgrade or fix to part of the application may not result in an application-wide outage.

Each part of a microservices application, which may be referred to as a microservice, may rely on other microservices to provide complete functionality to a user. For example, if a user of an online retail application wishes to purchase a product through an online application, the user may wish to know if the product is in stock. A microservice with access to the retailer's inventory database may communicate with the retailer's frontend microservice, which may in turn, communicate with an online shopping cart microservice. If the retailer added another feature that provided in-app product recommendations, this feature could be built into a new microservice that is to communicate with a database of product tags in order to make recommendations, while also communicating with the retailer's inventory database. Service-to-service communication is at the core of a microservices application. The logic governing communication can be coded into each service without a service mesh layer—but as communication gets more complex, a service mesh becomes more valuable. For cloud-native applications built in a microservices architecture, a service mesh packs a large number of discrete services into a functional application.

In conventional systems, a service mesh deployment may include a plurality of proxies that serve as the backbone of an application's data plane. The proxies may be used to connect microservices together and provide various services such as routing, monitoring, and/or filtering of network traffic. Proxies and the connections to and/or from each proxy may be numerous and complex. Therefore, configuring each proxy correctly and/or debugging such connections may be time-consuming and error prone.

For example, in some cases, a configuration file of a proxy may be thousands of lines of code. To add to the complexity, each proxy has its own configuration file that may configure multiple connections with other proxies. As such, the connections of the one or more proxies as configured may provide insight as to how network traffic should flow, but may be unknown and difficult to fully grasp.

Some conventional systems may employ a network traffic sniffer to show the flow of network traffic. Such systems may indicate how the network traffic flows under operation or testing, but does not indicate how network traffic should flow.

Aspects of the disclosure address the above-noted issues and other deficiencies by generating a map of one or more proxies and connections for each of the one or more proxies. Each connection may be determined by parsing the configuration file of a proxy to determine where the proxy is configured to route or accept data from. The map may be generated for all related proxies, such as all proxies that form a service mesh. The map may include an edge for each connection and/or a node for each proxy. As such, a user may view this map and inspect the flow of data to or from each proxy, as proposed by the map.

In one example, processing logic may obtain a configuration file of each of one or more proxies. Processing logic may parse the configuration file of each of the one or more proxies to determine one or more connections for each of the one or more proxies as defined by the configuration file, where each connection supports incoming or outgoing communication for each of the one or more proxies. Processing logic may generate a map that includes the one or more connections for each of the one or more proxies.

Processing logic may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

In some aspects, processing logic may obtain network traffic (e.g., from network monitoring activities performed by the proxies) and include the network traffic in the map. The map may be visually presented to show each connection as well as the actual network traffic. The network traffic may be superimposed over the proxies and connections shown on the map. As such, a user may view the map and quickly discern whether or not issues are present with the network, business logic, configuration of a proxy, or elsewhere in the system.

Figure 1:
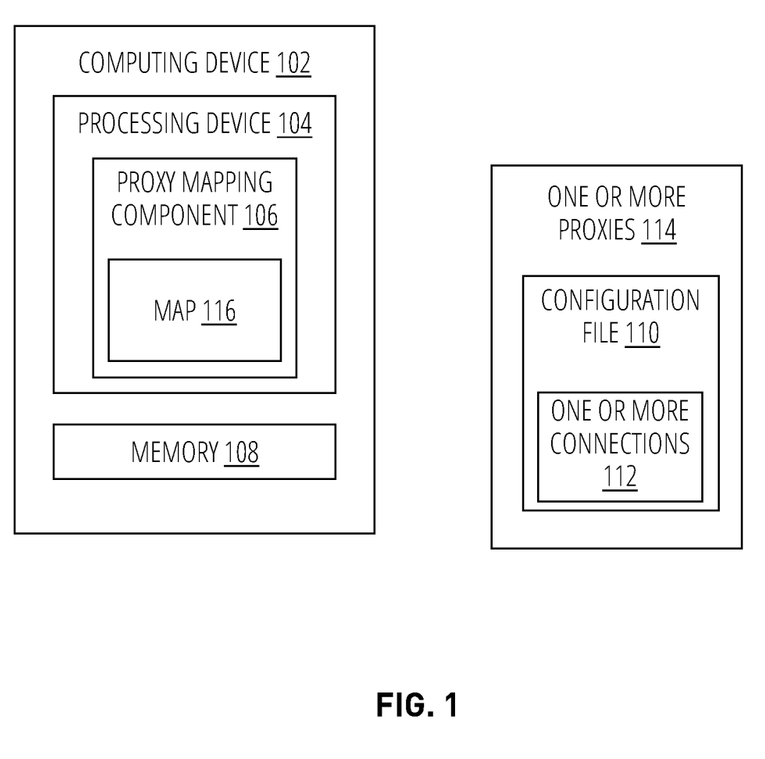
FIG. 1 shows a block diagram of a computing device that generates a map of one or more proxies, in accordance with some embodiments.

FIG. 1 shows a block diagram of a computing device 102 that generates a map 116 of one or more proxies 114, in accordance with some embodiments.

Computing device 102 includes a processing device 104 and a memory 108. Memory 108 may include volatile memory devices (e.g., random access memory (RAM)), non-volatile memory devices (e.g., flash memory) and/or other types of memory devices.

Processing device 104 includes a proxy mapping component 106. Proxy mapping component 106 may obtain a configuration file of each of one or more proxies. Proxy mapping component 106 may parse the configuration file 110 of each of the one or more proxies to determine one or more connections 112 for each of the one or more proxies as defined by the configuration file.

Each of the one or more proxies 114 may have its own configuration file 110 that defines each connection for that proxy. Each connection may include a network address (e.g., a URL), port, and/or communication protocol (e.g., TCP, UDP, SSL, etc.) to use to send or receive data. As such, each of the connections 112 supports incoming or outgoing communication for each of the one or more proxies.

Proxy mapping component 106 may generate a map 116 that includes the one or more connections 112 for each of the one or more proxies. The map may be a visual representation of how network traffic is expected to flow in or out or between each of the proxies. In some examples, proxy mapping component 106 may generate a node for each of the one or more proxies and an edge from and/or to the node for each of the one or more connections of each of the one or more proxies. A user may gain an understanding of how network traffic should flow, given the configuration of each proxy.

Figure 2:
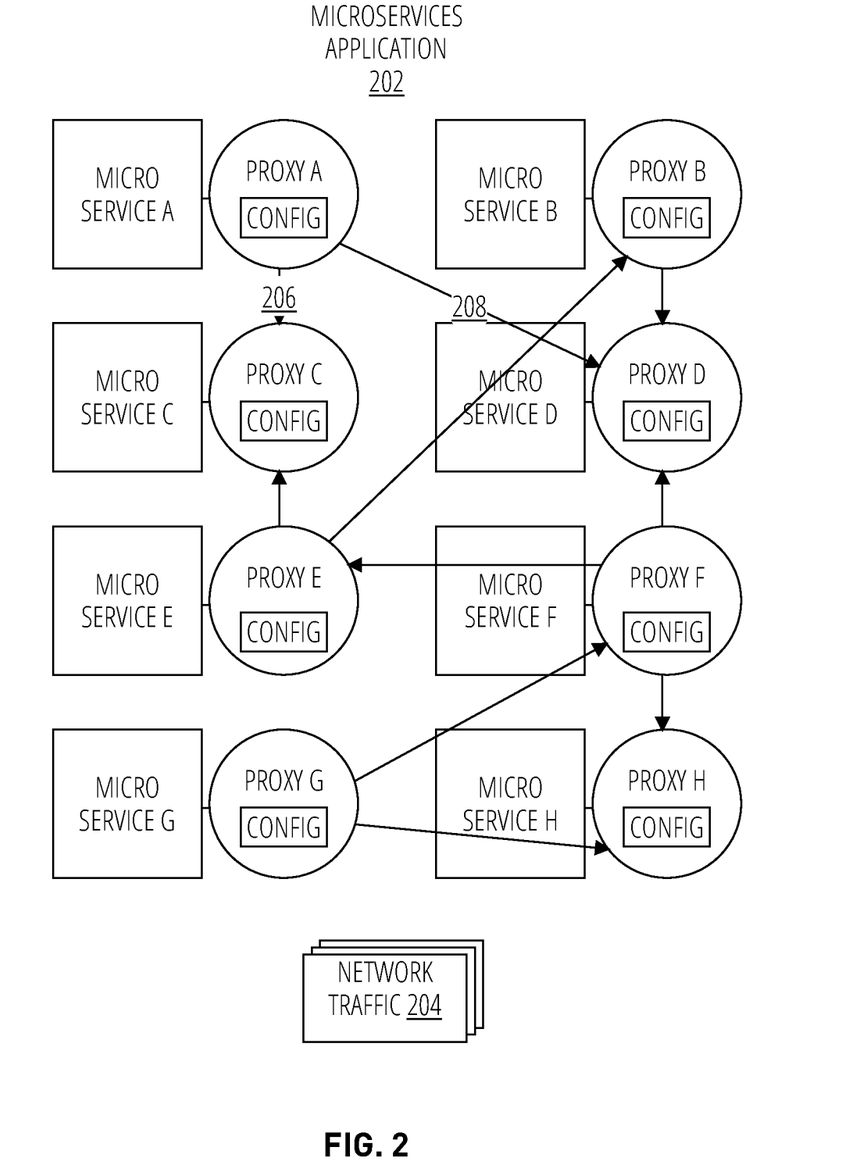
FIG. 2 shows an example service mesh with one or more proxies, in accordance with some embodiments.

FIG. 2 shows an example service mesh with one or more proxies, in accordance with some embodiments. In this example, microservices A-H may work together to support a common business logic. As such, microservices A-H may be collectively referred to as a microservices application 202. Each of the microservices may be communicatively coupled to a respective one of proxies A-H. Each of the proxies may be understood as a 'side car' of the microservice. A sidecar proxy sits alongside a microservice and routes requests to other proxies. Together, the proxies form a service mesh that abstracts the network to the microservice and the application, and may be agnostic to the microservice's implementation language.

Without a service mesh, each microservice may need to be coded with logic to govern service-to-service communication, which could be error prone and distract developers from business goals. Without the service mesh, communication failures may also be harder to diagnose because the logic that governs interservice communication is hidden within each service.

Further, each new service added to an app, or new instance of an existing service running in a container, complicates the communication environment and introduces new points of possible failure. Within a complex microservices architecture, it can become nearly impossible to locate where problems have occurred without a service mesh. A service mesh, however, may capture every aspect of service-to-service communication, which may be used for performance metrics and/or debugging.

As discussed, each proxy may include its own configuration file that defines the connections in or out of that proxy. A configuration file may include a JSON format or other format. The configuration file may include one or more listeners which may include a port (e.g., a TCP port) to listen on, and filters that the proxy may apply to the data that is received on the port. A configuration file may configure a proxy as an edge proxy or a service proxy. The configuration file may include a network address (e.g., a URL) to route data to. As such, a connection may be made for each network address that the file specifies to route data to, and/or ports that the proxy is configured to listen to.

All network traffic into or out of a microservice may go through its respective proxy through the defined connections. For example, proxy A may have a connection 206 that routes some data from microservice A to proxy C. Proxy C may route that data to microservice C. Further, proxy A may have a second connection 208 that routes data from microservice A to proxy D. Proxy D may route that data to microservice D, and so on. In some examples, each of the proxies may be an Envoy proxy.

A service mesh may help to control how different parts of an application share data with one another. A service mesh provides a dedicated infrastructure layer that is integrated within the application. This infrastructure layer also shows interaction between the various parts of an application, which may help improve communication within the application and reduce downtime when modifying or growing an application.

In one example, during runtime of a microservices application 202, each of the proxies A-H may be configured to monitor network traffic into and out of each proxy. Such network traffic may be obtained and pooled together as network traffic 204. Additionally, or alternatively, network traffic 204 may be obtained through a network sniffing tool and/or collected by a network device such as a switch or firewall. Network traffic 204 may be shown in a map of the proxies and connections thereof, to provide an improved understanding of the actual network traffic flow with respect to the expected network traffic flow as defined by the configuration file of each proxy.

Figure 3:
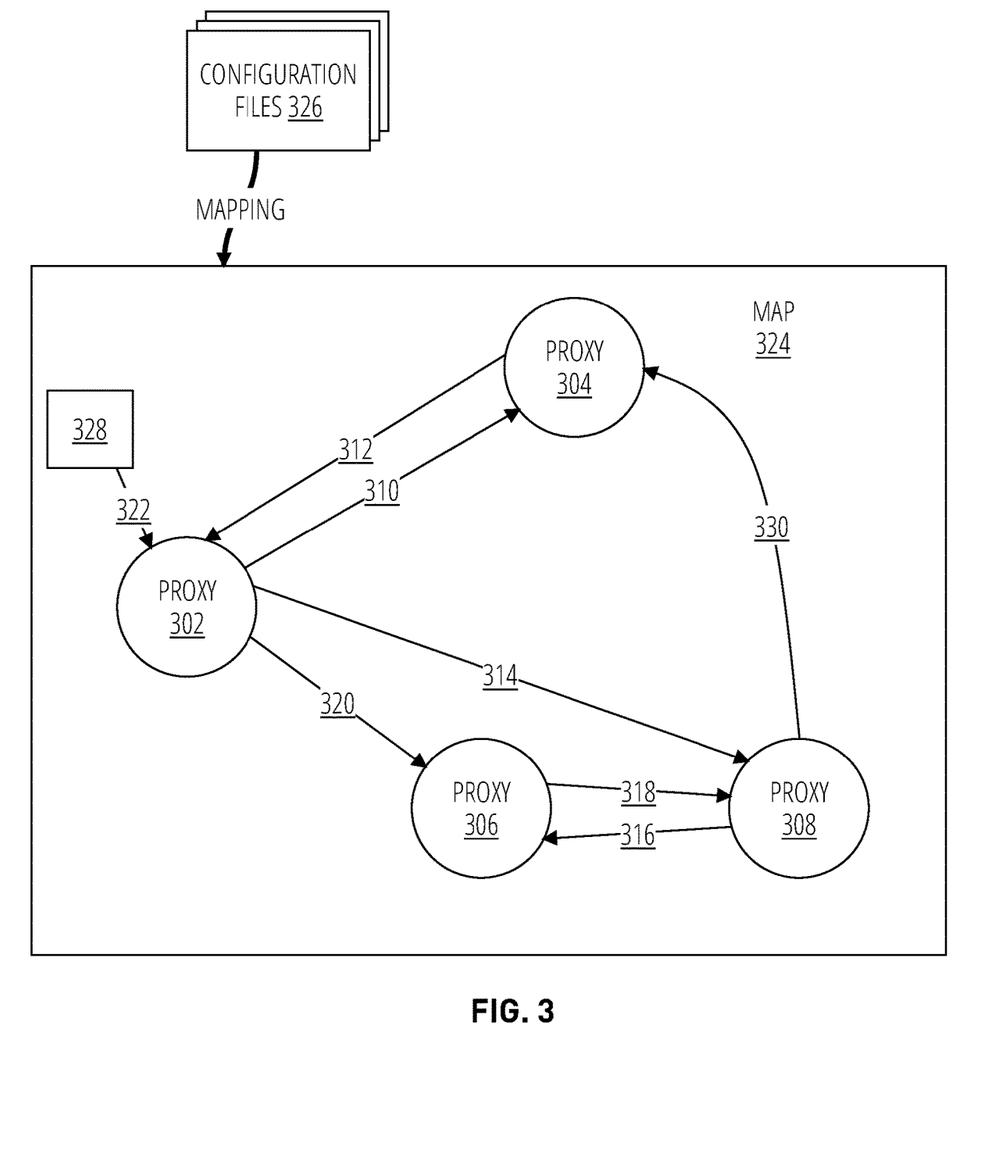
FIG. 3 shows an example mapping of one or more proxies, in accordance with some embodiments.

FIG. 3 shows an example map 324 of one or more proxies such as proxies 302, 304, 306, 308, in accordance with some embodiments. Processing logic can obtain a configuration file 326 of each of one or more proxies and parse each configuration file of each of the one or more proxies to determine one or more connections such as connections 310, 312, 314, 316, 318, 320, 322 and 330 as defined by the one or more configuration files 326. Each connection supports incoming or outgoing communication for each of the one or more proxies.

For example, a proxy may not send or receive data unless the configuration file specifies where to listen for the data and/or where to send the data. Thus, the one or more configuration files 326 may specify, in this example, that proxy 302 may receive data from a source 322 and proxy 304, and send data to proxy 304, 306, and 308. The configuration files 326 may specify that proxy 304 is to receive data from proxy 308 and send data to proxy 302. The configuration files 326 may specify that proxy 306 is to receive data from proxy 302 and proxy 308 and send data to proxy 318, and so on.

Processing logic may generate the map 324 that comprises the one or more connections 310, 312, 314, 316, 318, 320, 322, and 330 for each of the one or more proxies. Processing logic may generate the map 324 by parsing each configuration file of interrelated proxies. The map 324 may include computer-generated imagery (CGI) that represents the one or more proxies and the one or more connections.

For example, processing logic may generate a node for each of the one or more proxies and an edge from or to the node for each of the one or more connections. The node may be a shape (such as a circle, diamond, square, rectangle, oval, or other shape), an image, or other graphical representation of a proxy. Similarly, the edge may be a line or other graphical representation.

For example, for proxy 302, processing logic may generate a node that represents proxy 302, and an edge for each of connections 322, 310, and 312 that may extend from the node that represents proxy 302 to another proxy or other endpoint 328. Endpoint 328 may be a user machine, a web application, a service, a networked server, or other endpoint. Processing logic may present map 324 to a display. As such, the map 324 may include a visual representation of each proxy and each connection. A user may view the map to gain an understanding of how data should flow into and out of the one or more proxies.

In some examples, each edge may indicate a direction (e.g., with an arrow or other visual indication) in which the data is to flow through the connection, as determined from the respective configuration file. For example, the configuration file for a proxy 302 may specify that data is routed to proxy 304. Thus, an edge 310 may be rendered with an arrow or other visual indication showing the direction of data from proxy 302 to proxy 304. In some examples, processing logic may generate each edge with such directional indicators.

Figure 4:
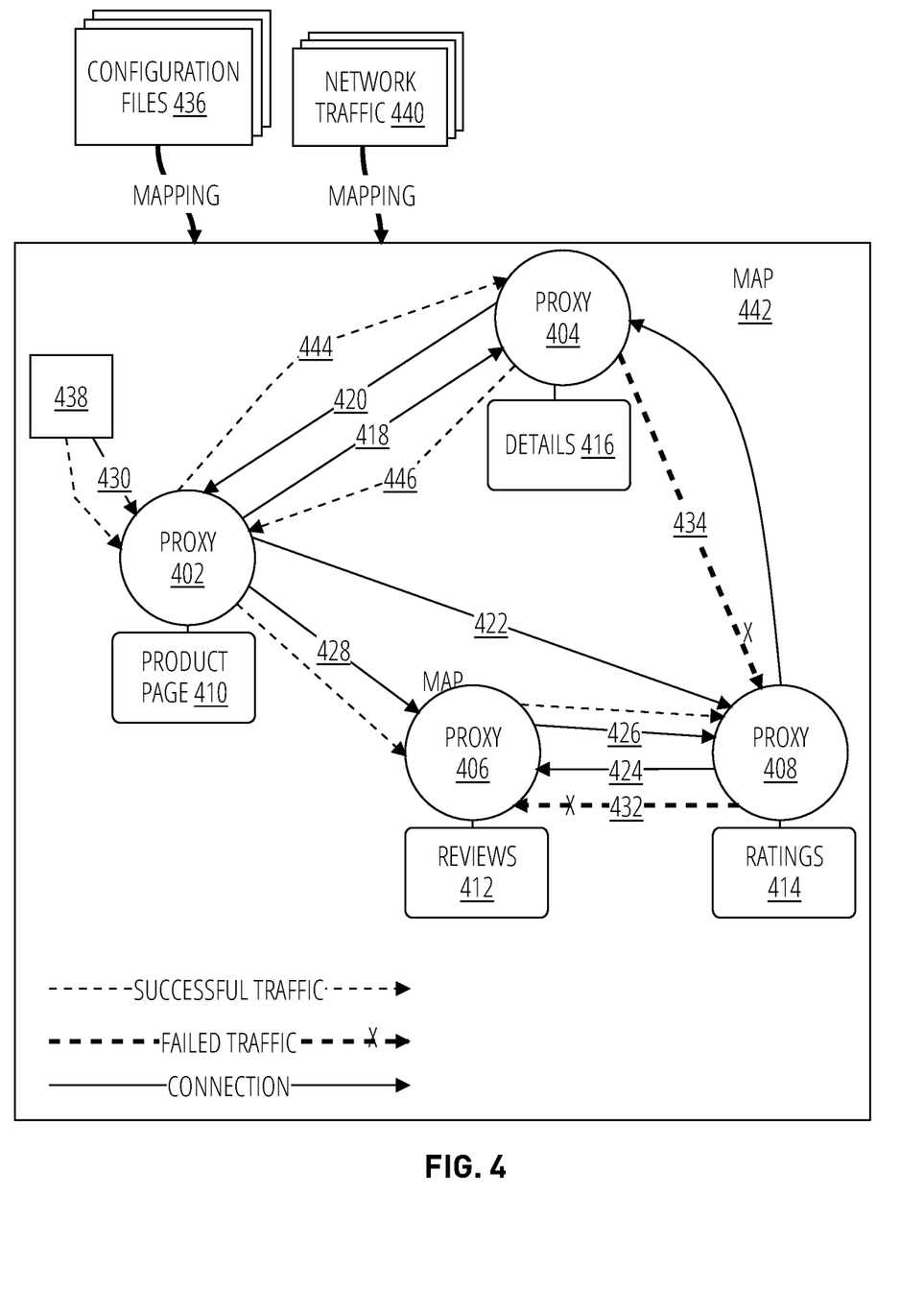
FIG. 4 shows an example mapping of one or more proxies with network traffic, in accordance with some embodiments.

FIG. 4 shows an example mapping of one or more proxies with network traffic 440, in accordance with some embodiments. Similar to FIG. 3, processing logic may obtain and parse configuration files 436 of proxies 402, 404, 406, and 408 to determine one or more connections 418, 420, 422, 424, 426, 428, 430 and 434 as defined by the configuration files.

Processing logic may generate a map 442 that comprises the one or more connections for each of the one or more proxies. The map 442 may include graphical representations of each proxy (e.g., as a node) and each connection (e.g., as an edge).

Further, processing logic may parse network traffic 440 of the one or more proxies to determine incoming or outgoing communication of each of the one or more proxies. The network traffic may be obtained from each of the proxies, and/or a network device such as a switch, router, or a network sniffer. This network traffic may be logged during operation and/or testing of the proxies. Processing logic may include this network traffic, such as the incoming or outgoing communications of each of the one or more proxies, in map 442. The network traffic may also be generated visually with one or more second edges into or out of each node, to indicate the actual flow of traffic into or out of a node. Processing logic may also generate these second edges with directional indicators as shown.

In this example, processing logic may render map 442 to include proxy 402. Edge 418 may extend from a node of proxy 402 to a node of proxy 404. Edge 420 may extend from the node of proxy 404 to the node of proxy 402. Further, processing logic may render second edges 444 and 446 (shown with dashed lines) to represent network traffic that is detected from proxy 402 to proxy 404 and from proxy 404 to proxy 402. Thus, based on this map, a user may see that network traffic flows between proxy 402 and 404 as expected based on how the proxies are configured. Network traffic may be rendered with visual differences than the proxy connections, so that the map can be deciphered by visual inspection. For example, network traffic may be rendered with a first color and connections may be rendered with a second color different from the first color.

Further, processing logic may generate the map to indicate failed network traffic and/or successful traffic. For example, failed traffic may be rendered with a color, a symbol (for example, an exclamation mark, or other symbol or shape), and/or other visual indication that shows that network traffic has failed. Failed network traffic may refer to a failed data transmission, not receiving expected data, or other failed network traffic.

For example, processing logic may generate a failed edge 432 from the node of proxy 408 to the node of proxy 406 indicating that proxy 408 tried to send data to proxy 406 but this data was not received. The map 442 may indicate that a connection exists from proxy 408 to proxy 406. Thus, a user may discern that the proxies are configured to send data in this direction. The user may discern that the failed network traffic may be a result of network connectivity or another issue.

As shown in FIG. 4, processing logic may also render a failed edge 434 from the node of proxy 404 to the node of proxy 408. In this case, however, the map may not show a connection from the node of proxy 404 to the node of proxy 408. As such, a user may discern that the proxies are not configured to route network traffic from proxy 404 to proxy 408. The user may look into this issue further and update the configuration files 436 to make the connection from proxy 404 to proxy 408 if deemed appropriate.

In some cases, such as for a microservices application, processing logic may generate a graphical representation of each of the microservices that are communicatively connected to each proxy. For example, processing logic may generate a node for product page 410, a node for reviews 412, a node for details 416, and a node for ratings 414. Each of the microservices may contain business logic for its respective portion of the overall application. The interconnected proxies form a service mesh that abstracts the communication layer for each microservice. Processing logic may obtain information such as a microservice name or ID from the configuration files 436 or from metadata of a microservices application, such as a project file.

Further, as described with respect to FIG. 3, proxies may communicate with non-proxy endpoints or proxies that are outside of the service mesh, such as endpoint 438. Processing logic may render nodes in the map 442 for these endpoints as well.

Figure 5:
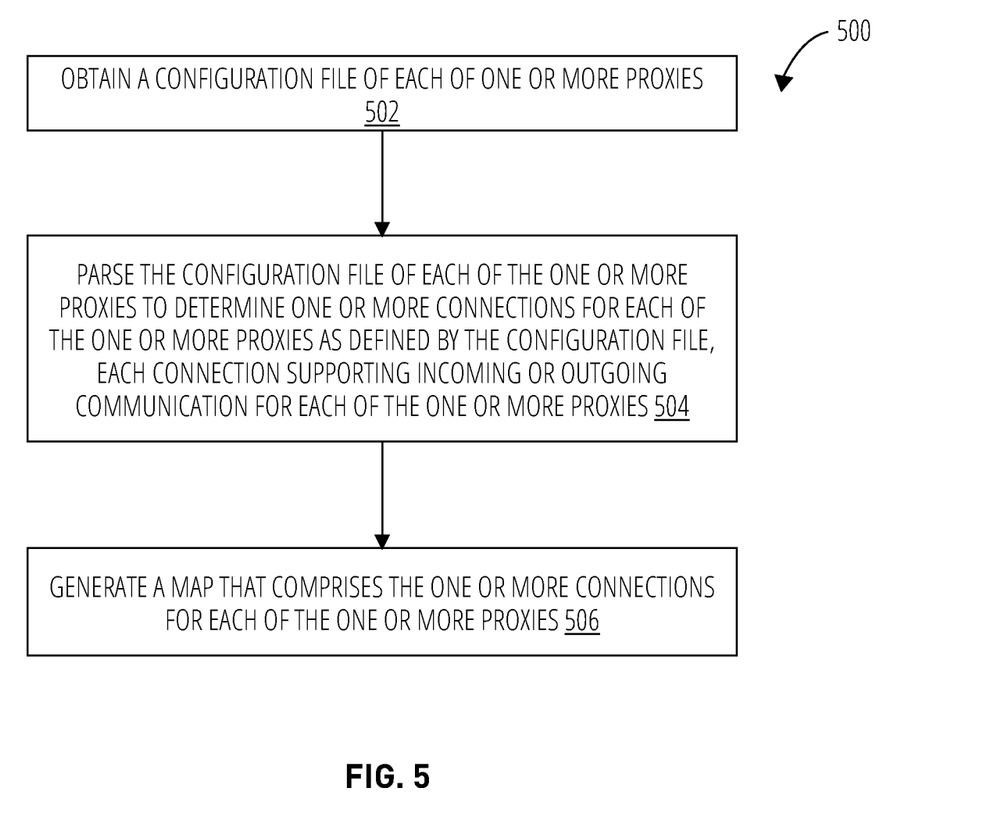
FIG. 5 shows an example method for mapping one or more proxies, in accordance with some embodiments.

FIG. 5 shows an example method 500 for mapping one or more proxies, in accordance with some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

At block 502, processing logic may obtain a configuration file of each of one or more proxies. Each configuration file may correspond to each of the one or more proxies, on a one to one basis. The configuration file may include a destination address (e.g., a URL), a listening port, an identifier for a source or destination proxy, or other metadata from which processing logic may parse to determine where data is to be routed to or received from.

At block 504, processing logic may parse the configuration file of each of the one or more proxies to determine one or more connections for each of the one or more proxies as defined by the configuration file, each connection supporting incoming or outgoing communication for each of the one or more proxies. In some examples, processing logic may include or leverage string parsers, a JSON parser, or other parser to parse through each configuration file (e.g., line by line) to extract where data is to be routed to or from for each proxy.

At block 506, processing logic may generate a map that comprises the one or more connections for each of the one or more proxies. Processing logic may include or leverage a graphical rendering engine that is used to render shapes, sizes, colors, lines, text, numbers, and/or graphical user interface objects such as buttons, drop-down menus, tabs, and/or other GUI objects, to generate the map. As such, the map may provide a user with an understanding of how data should flow to or from the one or more proxies.

In some aspects, as described in other sections, processing logic may obtain and render network traffic on the map. The network traffic between the proxies may be superimposed on the connections in the map, which may provide a user with further information that may be useful for troubleshooting.

Figure 6:
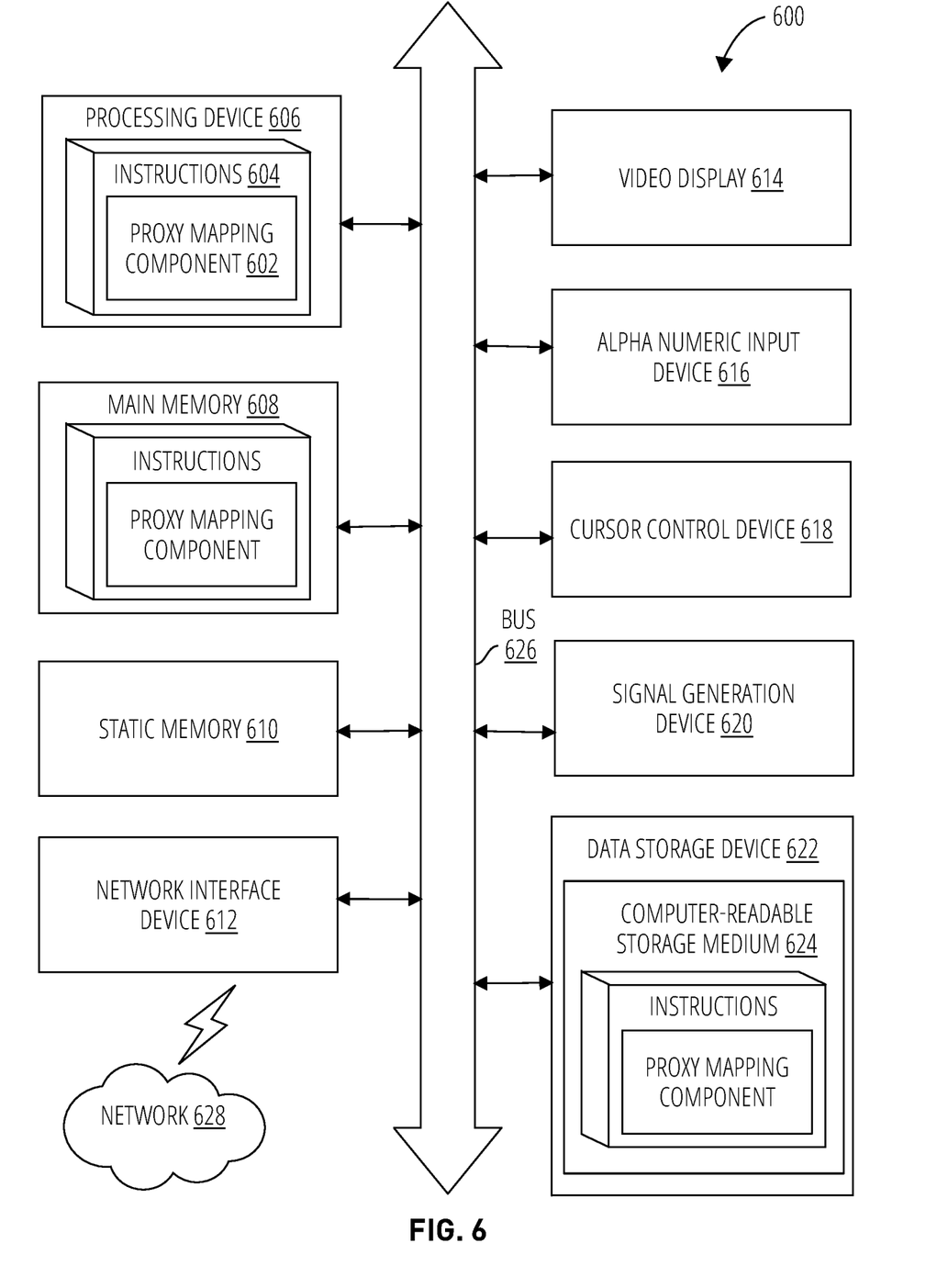
FIG. 6 is a block diagram illustrating a computing device for mapping one or more proxies, in accordance with some embodiments.

FIG. 6 is a block diagram of an example computing device 600 that may perform one or more of the operations described herein, in accordance with some embodiments. For example, the computing device may be used to develop an application for an event streaming platform, or to host the application that is a producer or consumer to an event streaming platform.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 606, a main memory 608 (e.g., synchronous dynamic random access memory (DRAM), read-only memory (ROM)), a static memory 610 (e.g., flash memory and a data storage device 622), which may communicate with each other via a bus 626.

Processing device 606 may be provided by one or more general-purpose processing devices such as a microprocessor, central processing unit, or the like. In an illustrative example, processing device 606 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 606 may also comprise one or more special-purpose processing devices such as an application specific integrated circuit (ASIC), a field programmable gate array (FPGA), a digital signal processor (DSP), network processor, or the like. The processing device 606 may be configured to execute the operations described herein, in accordance with one or more aspects of the present disclosure, for performing the operations and steps discussed herein.

Computing device 600 may further include a network interface device 612 which may communicate with a network 628. The computing device 600 also may include a video display unit 614 (e.g., a liquid crystal display (LCD) or a cathode ray tube (CRT)), an alphanumeric input device 616 (e.g., a keyboard), a cursor control device 618 (e.g., a mouse) and an acoustic signal generation device 620 (e.g., a speaker). In one embodiment, video display unit 614, alphanumeric input device 616, and cursor control device 618 may be combined into a single component or device (e.g., an LCD touch screen).

Data storage device 622 may include a computer-readable storage medium 624 on which may be stored one or more sets of instructions 604 that may include instructions for a processing device (e.g., processing device 104), for carrying out the operations described herein, in accordance with one or more aspects of the present disclosure. Instructions 604 may also reside, completely or at least partially, within main memory 608 and/or within processing device 606 during execution thereof by computing device 600, main memory 608 and processing device 606 also constituting computer-readable media. The instructions 604 may further be transmitted or received over a network 628 via network interface device 612. The instructions 604 may contain instructions of a proxy mapping component 602 that, when executed, perform the operations and steps discussed herein.

While computer-readable storage medium 624 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "sending", "storing", "obtaining", "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component may be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" may include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   obtaining, by a processing device, a configuration file of each of a plurality of proxies;
   parsing, by the processing device, the configuration file of each of the plurality of proxies to determine one or more connections for each of the plurality of proxies including parsing the configuration file to determine where a respective one of the plurality of proxies is configured to route data to or accept the data from as defined by the configuration file, each connection supporting incoming or outgoing communication for each of the plurality of proxies;
   parsing, by the processing device, network traffic of the plurality of proxies to determine incoming or outgoing communication of each of the plurality of proxies; and
   generating, by the processing device, a map that comprises the one or more connections for each of the plurality of proxies, including generating a first node for a first of the plurality of proxies and a second node for a second of the plurality of proxies, generating a first edge between the first node and the second node wherein the first edge indicates a direction of expected data flow in accordance with how the configuration file defines where the first or the second of the plurality of proxies is configured to route the data to or accept the data from, and in response to the network traffic being between the first of the plurality of proxies and the second of the plurality of proxies, generating a second edge between the first node and the second node having a directional indicator indicating a direction of the network traffic between the first of the plurality of proxies and the second of the plurality of proxies, wherein the first edge and the second edge are presented between the first node and the second node as being visually different.

2. The method of claim 1, wherein the first edge has a different color than the second edge.

3. The method of claim 1, wherein generating the map includes visually presenting the second edge with an indication of failed network traffic in response to a failed data transmission in the network traffic.

4. The method of claim 1, wherein the configuration file includes filters that a respective one of the plurality of proxies applies to received data.

5. The method of claim 4, wherein the configuration file configures the respective one of the plurality of proxies as an edge proxy or a service proxy.

6. The method of claim 1, wherein each of the plurality of proxies serves to send or receive communication for a respective microservice.

7. The method of claim 6, wherein the plurality of proxies form a service mesh.

8. The method of claim 1, further comprising presenting, by the processing device, the map to a display.

9. A system comprising:
a memory; and
a processing device operatively coupled to the memory, the processing device to:
obtain a configuration file of each of a plurality of proxies;
parse the configuration file of each of the plurality of proxies to determine one or more connections for each of the plurality of proxies including parsing the configuration file to determine where a respective one of the plurality of proxies is configured to route data to or accept the data from as defined by the configuration file, each connection supporting incoming or outgoing communication for each of the plurality of proxies; and
parse, by the processing device, network traffic of the plurality of proxies to determine incoming or outgoing communication of each of the plurality of proxies; and
generate a map that comprises the one or more connections for each of the plurality of proxies, including to generate a first node for a first of the plurality of proxies and a second node for a second of the plurality of proxies, to generate a first edge between the first node and the second node wherein the first edge indicates a direction of expected data flow in accordance with how the configuration file defines where the first or the second of the plurality of proxies is configured to route the data to or accept the data from, and in response to the network traffic being between the first of the plurality of proxies and the second of the plurality of proxies, to generate a second edge between the first node and the second node having a directional indicator indicating a direction of the network traffic between the first of the plurality of proxies and the second of the plurality of proxies, wherein the first edge and the second edge are presented between the first node and the second node as being visually different.

10. The system of claim 9, wherein the first edge has a different color than the second edge.

11. The system of claim 9, wherein to generate the map includes to visually present the second edge with an indication of failed network traffic in response to a failed data transmission in the network traffic.

12. The system of claim 9, wherein the configuration file includes filters that a respective one of the plurality of proxies applies to received data.

13. The system of claim 12, wherein the configuration file configures the respective one of the plurality of proxies as an edge proxy or a service proxy.

14. The system of claim 9, wherein each of the plurality of proxies serves to send or receive communication for a respective microservice.

15. A non-transitory computer-readable storage medium including instructions that, when executed by a processing device, cause the processing device to:
obtain a configuration file of each of plurality of proxies;
parse the configuration file of each of the plurality of proxies to determine one or more connections for each of the plurality of proxies including parsing the configuration file to determine where a respective one of the plurality of proxies is configured to route data to or accept the data from as defined by the configuration file, each connection supporting incoming or outgoing communication for each of the plurality of proxies;
parse network traffic of the plurality of proxies to determine incoming or outgoing communication of each of the plurality of proxies; and
generate a map that comprises the one or more connections for each of the plurality of proxies, including to generate a first node for a first of the plurality of proxies and a second node for a second of the plurality of proxies, to generate a first edge between the first node and the second node wherein the first edge indicates a direction of expected data flow in accordance with how the configuration file defines where the first or the second of the plurality of proxies is configured to route the data to or accept the data from, and in response to the network traffic being between the first of the plurality of proxies and the second of the plurality of proxies, to generate a second edge between the first node and the second node having a directional indicator indicating a direction of the network traffic between the first of the plurality of proxies and the second of the plurality of proxies, wherein the first edge and the second edge are presented between the first node and the second node as being visually different.

16. The non-transitory computer-readable storage medium of claim 15, wherein the first edge has a different color than the second edge.

17. The non-transitory computer-readable storage medium of claim 15, wherein the configuration file includes filters that a respective one of the plurality of proxies applies to received data.

18. The non-transitory computer-readable storage medium of claim 17, wherein the configuration file configures the respective one of the plurality of proxies as an edge proxy or a service proxy.

19. The non-transitory computer-readable storage medium of claim 15, wherein the processing device is further to present the map to a display.

20. The non-transitory computer-readable storage medium of claim 15, wherein each of the plurality of proxies serves to send or receive communication for a respective microservice.

* * * * *